US012254648B2

(12) United States Patent
Saniei et al.

(10) Patent No.: US 12,254,648 B2
(45) Date of Patent: *Mar. 18, 2025

(54) SYSTEMS AND METHODS FOR LOCATING OBJECTS

(71) Applicant: BNSF Railway Company, Fort Worth, TX (US)

(72) Inventors: Michael Saied Saniei, Fort Worth, TX (US); Xiaoyan Si, Kirkland, WA (US); Siva Prasad Vysyaraju, Keller, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,406

(22) Filed: Aug. 31, 2023

(65) Prior Publication Data

US 2023/0410354 A1 Dec. 21, 2023

Related U.S. Application Data

(63) Continuation of application No. 17/364,660, filed on Jun. 30, 2021, now Pat. No. 11,763,480, which is a (Continued)

(51) Int. Cl.
*G06T 7/00* (2017.01)
*G01S 19/45* (2010.01)
(Continued)

(52) U.S. Cl.
CPC ............... *G06T 7/70* (2017.01); *G01S 19/45* (2013.01); *G06T 7/50* (2017.01); *G06T 7/80* (2017.01);
(Continued)

(58) Field of Classification Search
CPC .... G06T 7/70; G06T 7/50; G06T 7/80; G06T 2207/10028; G06T 2207/30252; G06T 2207/30244; G01S 19/45
See application file for complete search history.

(56) References Cited

U.S. PATENT DOCUMENTS

| 2004/0264761 A1 | 12/2004 | Mas et al. |
| 2015/0269722 A1 | 9/2015 | Naithani et al. |

(Continued)

OTHER PUBLICATIONS

Patent Cooperation Treaty, Search Report and Written Opinion, International No. PCT/US2020/039044, date of mailing Oct. 2, 2020, 16 pages.

(Continued)

*Primary Examiner* — Ping Y Hsieh
(74) *Attorney, Agent, or Firm* — Whitaker Chalk Swindle & Schwartz PLLC; Enrique Sanchez, Jr.

(57) ABSTRACT

In one embodiment, a method includes receiving an image generated by a camera associated with a vehicle. The image includes a point of interest (POI) associated with a physical object. The method also includes determining a number of pixels from the POI of the image to an edge of the image. The edge of the image represents a location of the camera. The method further includes determining an offset distance from the POI to a Global Positioning System (GPS) unit associated with the vehicle using the number of pixels.

20 Claims, 5 Drawing Sheets

Related U.S. Application Data continuation of application No. 16/540,867, filed on Aug. 14, 2019, now Pat. No. 11,107,233.

(51) Int. Cl.
  *G06T 7/50* (2017.01)
  *G06T 7/70* (2017.01)
  *G06T 7/80* (2017.01)

(52) U.S. Cl.
  CPC .............. *G06T 2207/10028* (2013.01); *G06T 2207/30244* (2013.01); *G06T 2207/30252* (2013.01)

(56) References Cited

U.S. PATENT DOCUMENTS

| | | |
|---|---|---|
| 2018/0127006 A1 | 5/2018 | Wade |
| 2019/0180118 A1* | 6/2019 | Kraeling ................. G01S 11/12 |
| 2019/0183310 A1* | 6/2019 | Herron ................. G05D 1/0231 |
| 2019/0259281 A1* | 8/2019 | Martin ................... G08G 1/056 |
| 2021/0049783 A1 | 2/2021 | Saniei et al. |

OTHER PUBLICATIONS

Ellum, Cameron, et al.; "The Development of a Backpack Mobile Mapping Systems", Article, International of Photogrammetry and Remote Sensing, vol. XXXIII, Part B2, pp. 184-191, Amsterdam 2000.

\* cited by examiner

SYSTEMS AND METHODS FOR LOCATING OBJECTS

CROSS-REFERENCE TO RELATED APPLICATIONS

The present application is a Continuation Application of U.S. patent application Ser. No. 17/364,660, filed Jun. 30, 2021, which is a Continuation Application of U.S. patent application Ser. No. 16/540,867, filed Aug. 14, 2019, the contents of which are incorporated herein in their entireties for all purposes.

TECHNICAL FIELD

This disclosure generally relates to locating objects, and more specifically to systems and methods for locating objects.

BACKGROUND

Positive train control (PTC) is a communications-based train control system used to prevent accidents involving trains. PTC improves the safety of railway traffic by monitoring the locations of PTC critical assets within a railroad environment. However, the locations of the PTC critical assets may be misrepresented due to field error and/or changes within the railroad environment, which may negatively affect the performance of the PTC system.

SUMMARY

According to an embodiment, a method includes receiving an image generated by a camera associated with a vehicle. The image includes a point of interest (POI) associated with a physical object. The method also includes determining a number of pixels from the POI of the image to an edge of the image. The edge of the image represents a location of the camera. The method further includes determining an offset distance from the POI to a Global Positioning System (GPS) unit associated with the vehicle using the number of pixels.

According to another embodiment, a system includes one or more processors and a memory storing instructions that, when executed by the one or more processors, cause the one or more processors to perform operations including receiving an image generated by a camera associated with a vehicle. The image includes a POI associated with a physical object. The operations also include determining a number of pixels from the POI of the image to an edge of the image. The edge of the image represents a location of the camera. The operations further include determining an offset distance from the POI to a GPS unit associated with the vehicle using the number of pixels.

According to yet another embodiment, one or more computer-readable storage media embody instructions that, when executed by a processor, cause the processor to perform operations including receiving an image generated by a camera associated with a vehicle. The image includes a POI associated with a physical object. The operations also include determining a number of pixels from the POI of the image to an edge of the image. The edge of the image represents a location of the camera. The operations further include determining an offset distance from the POI to a GPS unit associated with the vehicle using the number of pixels.

Technical advantages of certain embodiments of this disclosure may include one or more of the following. Certain systems and methods described herein locate objects (e.g., PTC critical assets) within a railroad environment without manual measurements on or near the railroad, which improves the safety and efficiency of locating objects. Certain systems and methods described herein leverage information collected from geometry cars, such as images and GPS locations, which improves the accuracy of locating objects.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

A vehicle such as track geometry car may collect data as the vehicle travels through an environment. The vehicle may be equipped with a camera that captures images of physical objects within the environment and a GPS unit that captures GPS locations. To accurately locate the physical objects within the environment, the GPS locations need to be calibrated to account for the offset distance between the camera location and the location of the GPS unit. Certain embodiments of this disclosure include systems and methods for accurately locating objects within an environment using data collected from the camera and the GPS unit to determine the offset distance. The objects may be PTC critical objects associated with a railroad environment that are monitored for PTC compliance.

Figure 1:
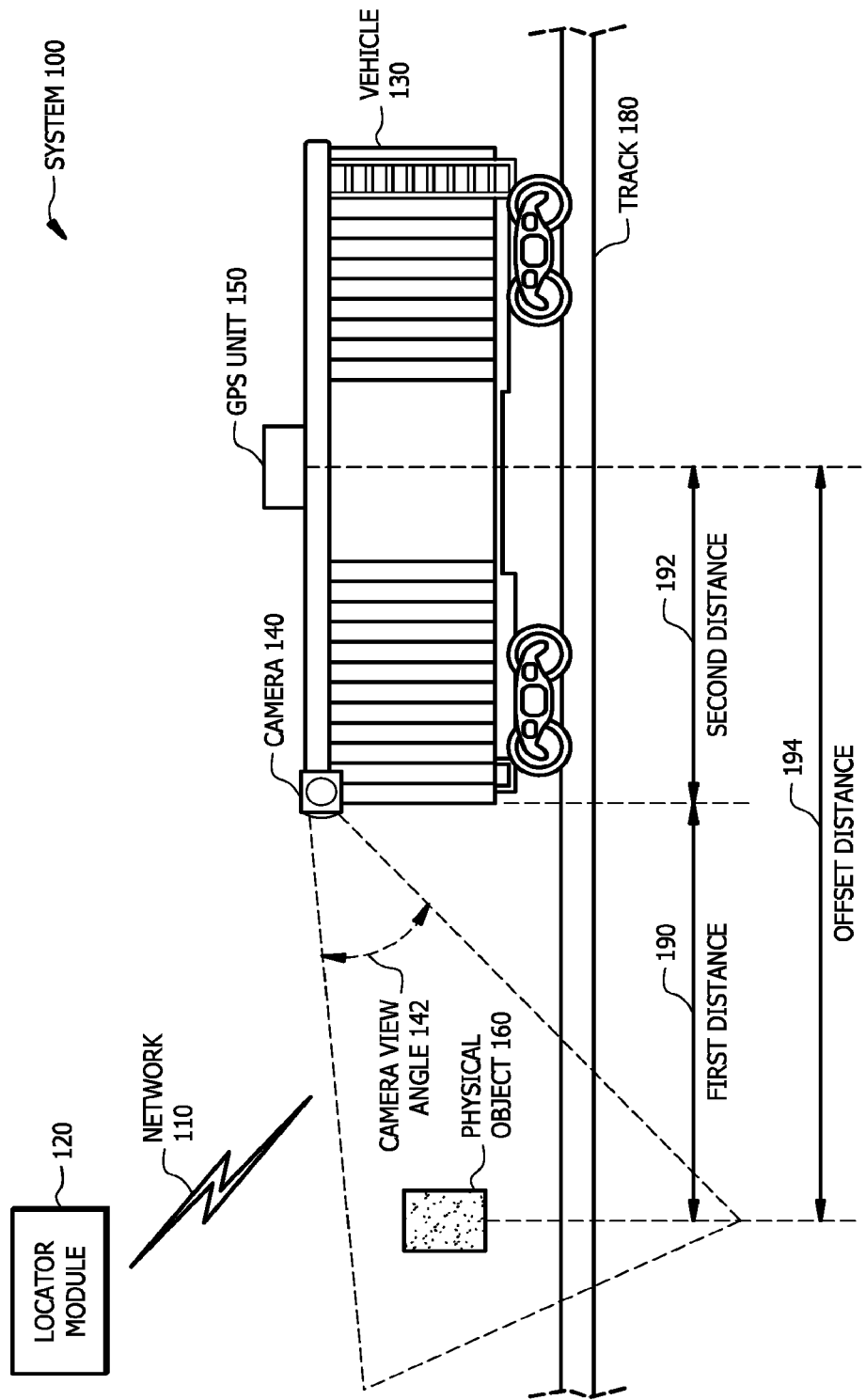
FIG. 1 illustrates an example system for locating objects.
Figure 2:
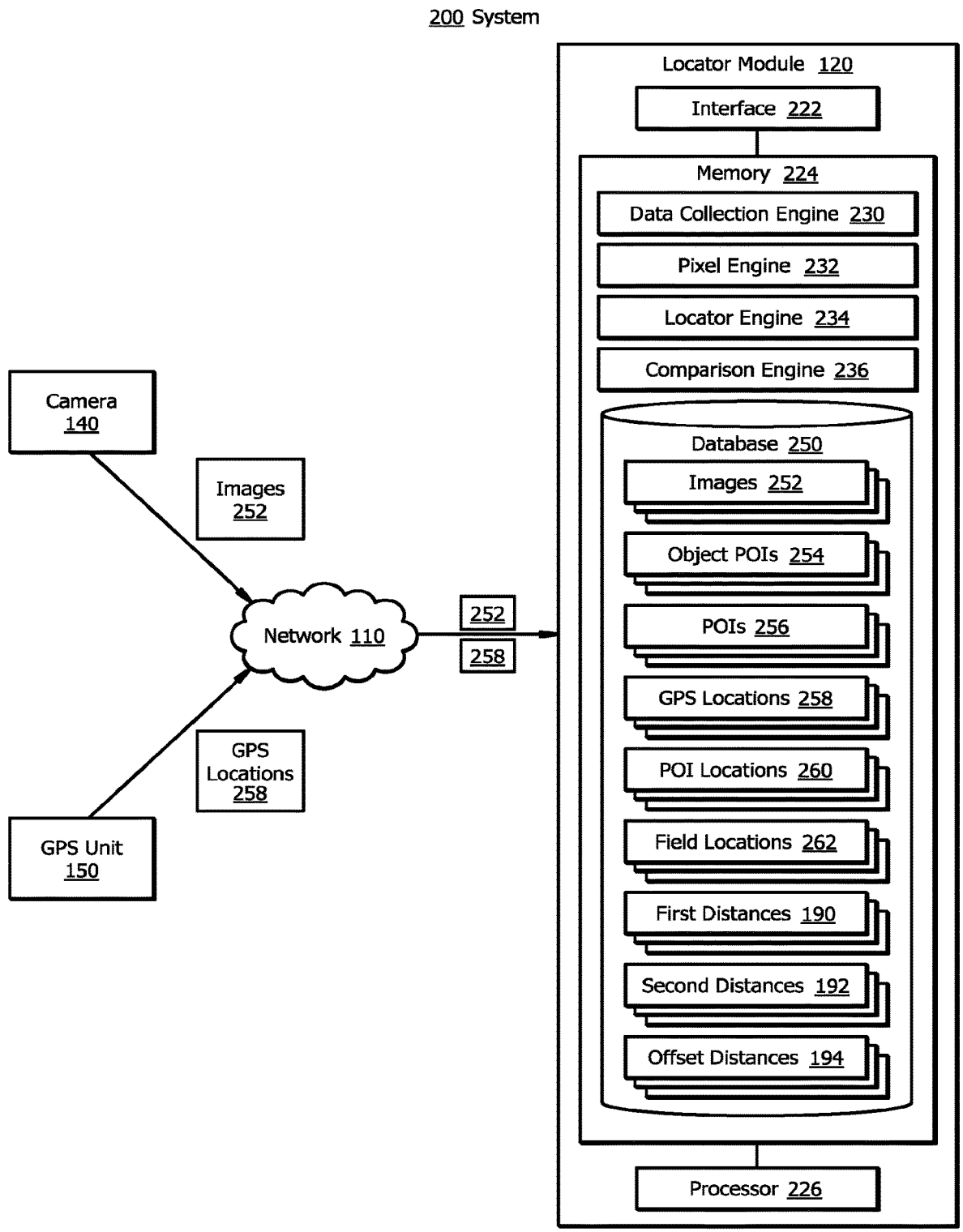
FIG. 2 illustrates another example system for locating objects.
Figure 3:
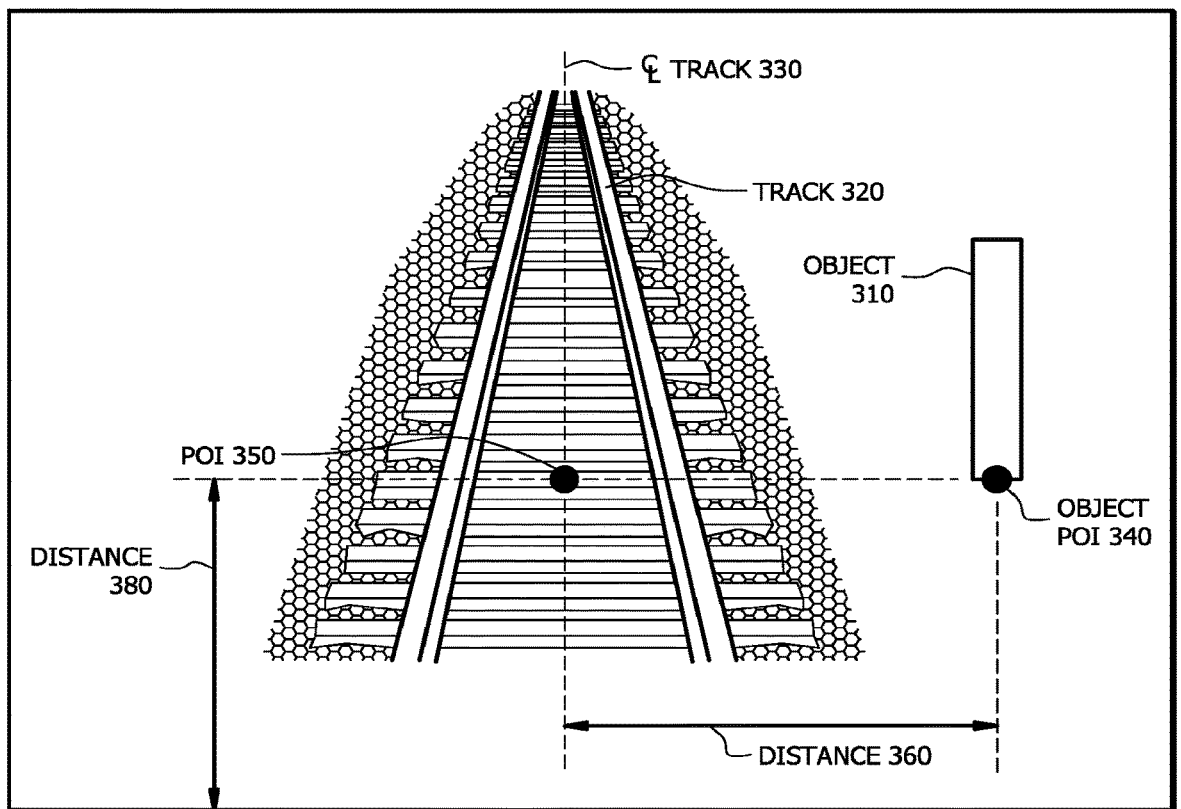
FIG. 3 illustrates an example image that may be used by the systems of FIGS. 1 and 2.
Figure 4:
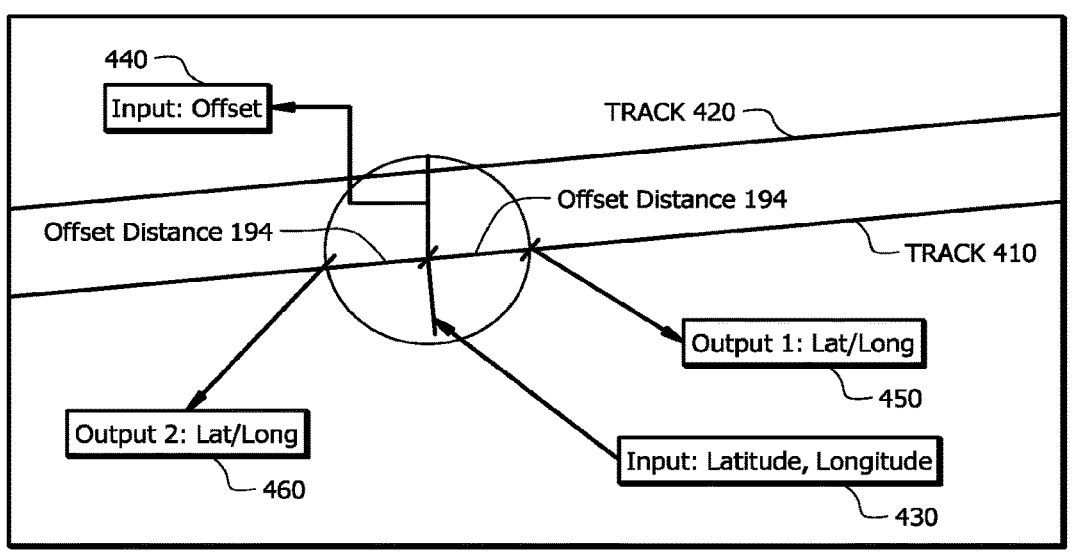
FIG. 4 illustrates an example output that may be generated by the systems of FIGS. 1 and 2.
Figure 5:
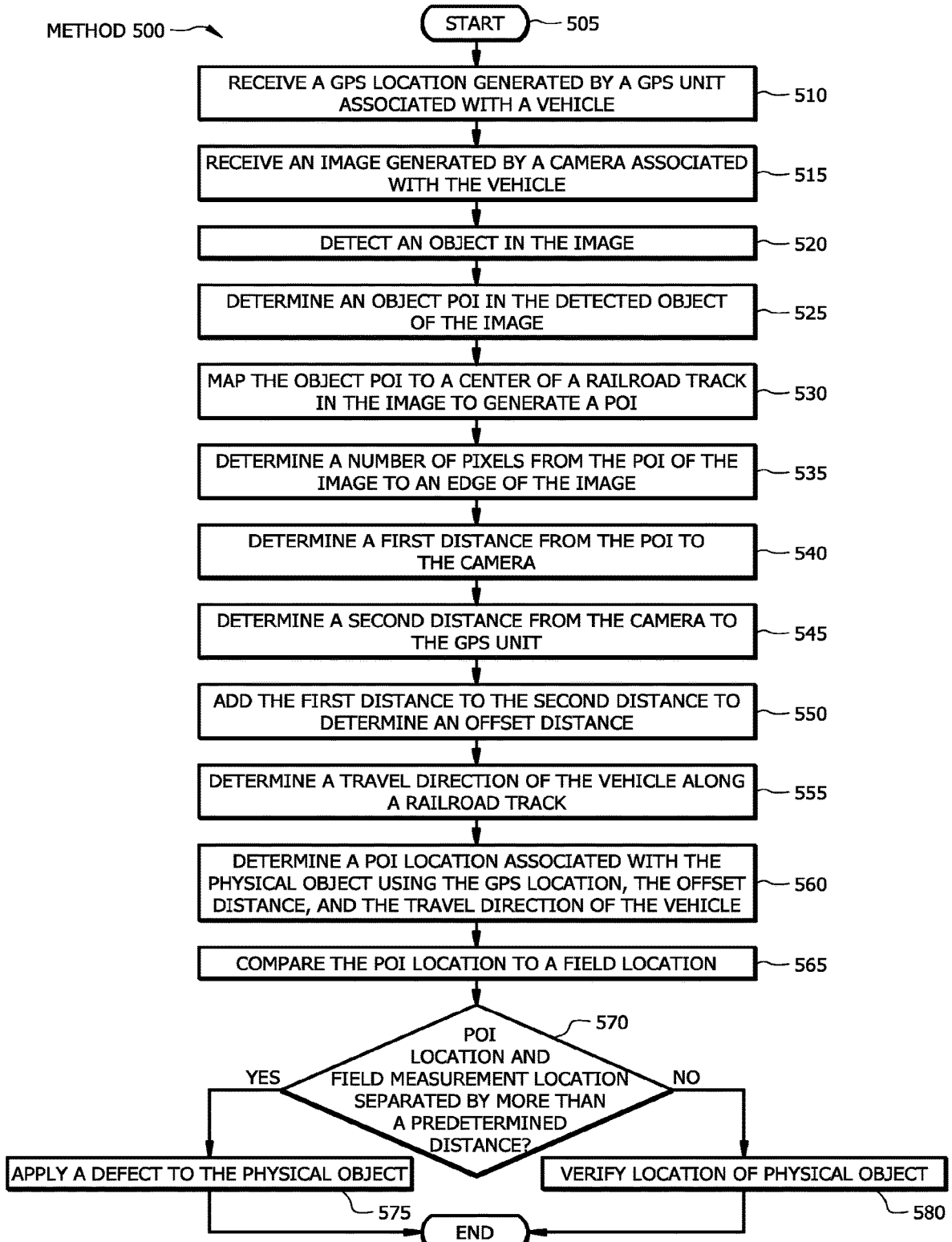
FIG. 5 illustrates an example method for locating objects.
Figure 6:
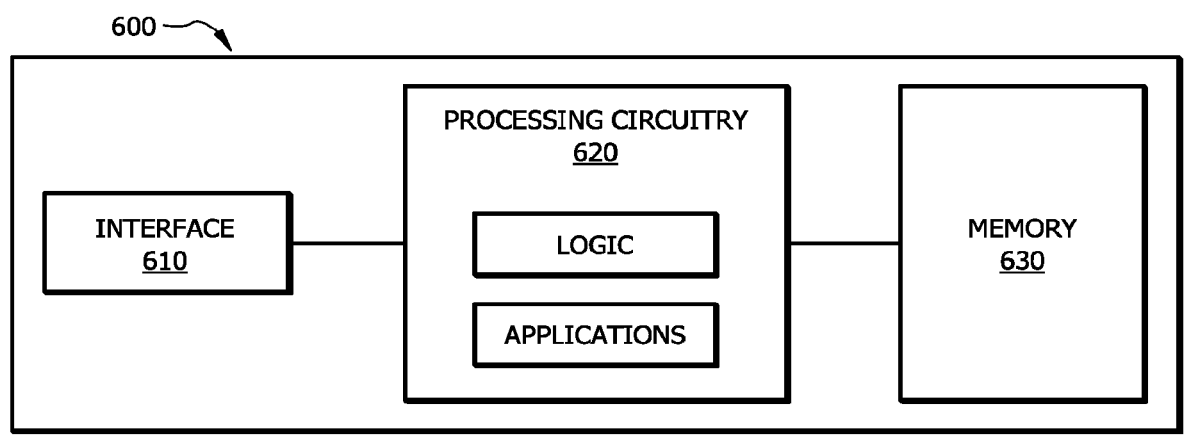
FIG. 6 illustrates an example computer system that may be used by the systems and methods described herein.

FIGS. 1 through 6 show example systems and methods for locating objects. FIGS. 1 and 2 show example systems for locating objects. FIG. 3 shows an example image that may be used by the systems of FIGS. 1 and 2 and FIG. 4 shows an example output that may be generated by the systems of FIGS. 1 and 2. FIG. 5 shows an example method for locating objects. FIG. 6 illustrates an example computer system that may be used by the systems and methods described herein.

FIG. 1 illustrates an example system 100 for locating objects. System 100 of FIG. 1 includes a network 110, a locator module 120, a vehicle 130, a camera 140, a GPS unit 150, and a physical object 160. System 100 or portions thereof may be associated with an entity, which may include any entity, such as a business, company (e.g., a railway company, a transportation company, etc.), or a government agency (e.g., a department of transportation, a department of public safety, etc.) that may locate objects. The elements of system 100 may be implemented using any suitable combination of hardware, firmware, and software.

Network 110 of system 100 may be any type of network that facilitates communication between components of system 100. Network 110 may connect locator module 120 to camera 140 and/or GPS unit 150 of system 100. Although this disclosure shows network 110 as being a particular kind of network, this disclosure contemplates any suitable network. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. One or more portions of network 110 may include one or more access (e.g., mobile access), core, and/or edge networks. Network 110 may be any communications network, such as a private network, a public network, a connection through Internet, a mobile network, a WI-FI network, a Bluetooth network, etc. Network 110 may include cloud computing capabilities. One or more components of system 100 may communicate over network 110. For example, locator module 120 may communicate over network 110, including receiving information from camera 140 and/or GPS unit 150.

Locator module 120 of system 100 represents any suitable computing component that may be used to locate objects. Locator module 120 may be communicatively coupled to camera 140 and/or GPS unit 150 via network 110. Locator module 120 controls the operations of system 100. Locator module 120 is described in more detail in FIG. 2 below.

Vehicle 130 of system 100 represents a vehicle (e.g., a van, a truck, a car, a rail car, etc.) that collects data. In the illustrated embodiment of FIG. 1, vehicle 130 is an automated track inspection vehicle (e.g., a track geometry car) that travels along railroad track 180. Vehicle 180 may collect data associated with a railroad environment. For example, one or more components of vehicle 180 may collect images and/or sensor data associated with the railroad environment as vehicle 180 travels along railroad track 180. The collected data may be used to locate objects within a railroad environment.

Camera 140 of system 100 is any device that records visual images. Camera 140 may be a video camera such as a digital camera, a digital single-lens reflex (DSLR) camera, a mirrorless video camera, a sports and action video camera, and the like. Camera 140 is physically attached to vehicle 130. In the illustrated embodiment of FIG. 1, camera 140 is mounted to a top, front end portion of vehicle 130. Camera 140 is oriented such that the camera view angle 142 of camera 140 captures physical object 160 and track 180. Camera 140 captures images (see, e.g., image 300 of FIG. 3) of physical object 160 and track 180 as vehicle 130 travels along track 180. The images captured by camera 140 depend on camera view angle 142. Camera view angle 142 is influenced by the position of camera 140 relative to vehicle 130 and/or track 180. Camera 140 may communicate the generated images to locator module 120 via network 110.

GPS unit 150 of system 100 is any device that receives information from one or more GPS satellites and calculates the geographical position of GPS unit 150 using the received information. GPS unit 150 may be a GPS tracking unit (e.g., a data logger, a data pusher, a data puller, and the like) carried by vehicle 130 that uses GPS to track the movements of GPS unit 150 and determine the location of GPS unit 150 at a specific point in time. GPS unit 150 may include one or more GPS sensors, receivers, and/or antennas. GPS unit 150 is physically attached to vehicle 130. In the illustrated embodiment of FIG. 1, GPS unit 150 is mounted to a center top portion of vehicle 130. GPS unit 150 may communicate one or more GPS locations of GPS unit 150 to locator module 120 via network 110. Each GPS location may be represented by coordinates (e.g., a latitude coordinate and a longitude coordinate) or any other suitable representation.

Physical object 160 of system 100 represents any physical object associated with a railroad environment. The railroad environment is an area encompassing one or more railroad tracks 180. Physical object 160 may be a train-controlled signal, a switch point, a crossing, a mile post sign, a speed sign, a clearance point, and the like. In certain embodiments, physical object 160 represents a PTC critical asset. PTC is a system of functional requirements for monitoring and controlling train movements.

Locator module 120 determines a geographical location of physical object 160 using one or more images captured by camera 140 and a GPS location captured by GPS unit 150. Locator module 120 may determine the geographical location of physical object 160 relative to a centerline of railroad track 180. The centerline of railroad track 180 is a line that is centered between the two outer rails of railroad track 180. Locator module 120 may use the railroad track centerline as a reference line for locating physical objects 160. In certain embodiments, locator module 120 detects an object (e.g., a representation of physical object 160) in an image received from camera 140 and determines an object point of interest (POI) in the detected object of the image. The object POI represents a specific point within the detected object of the image. Locator module 120 may map the object POI to a centerline of a railroad track (e.g., a representation of railroad track 180) in the image to generate a POI. The POI represents a location of physical object 160 transposed to the centerline of railroad track 180.

Locator module 120 may determine first distance 190 from the POI (which corresponds to the location of physical object 160 along the centerline of track 180) to camera 140. Locator module 120 determines first distance 190 by calculating a number of pixels from the POI of the image to an edge of the image. The edge of the image represents a location of camera 140 (e.g., a location of a lens of camera 140). Locator module 120 then converts the number of pixels to an equivalent distance using camera view angle 142.

Locator module 120 may determine a second distance 192 from camera 140 to GPS unit 150. Second distance 192 depends on the relative locations of camera 140 and GPS unit 150. In the illustrated embodiment of FIG. 1, second distance 192 is a predetermined distance measured from camera 140 attached to a top, front end of vehicle 130 to GPS unit 150 attached to a top, center portion of vehicle 130. In certain embodiments, second distance 192 is measured from a lens of camera 140 to an antenna of GPS unit 150. Second distance 192 may be approximately equal to half a length of vehicle 130 (e.g., a geometry car). For example, second distance 192 may be between 200 and 230 inches (e.g., 216 inches.)

Locator module 120 may add first distance 190 to second distance 192 to determine offset distance 194. Offset distance 194 represents the distance from a location of physical object 160 transposed to the centerline of railroad track 180 to GPS unit 150. Since the image of physical object 160 and the GPS location of GPS unit 150 are captured by camera 140 and GPS unit 150, respectively, at the same or approximately the same point in time, the GPS location does not accurately reflect the location of physical object 160. Offset distance 194 accounts for the difference between the location of physical object 160 and the GPS location of GPS unit 150 at a specific point in time.

In operation, locator module 120 receives a GPS location generated by GPS unit 150 mounted to vehicle 130 and an image generated by camera 140 mounted to vehicle 130. The GPS location and the image are captured at the same point in time. Locator module 120 detects an object (e.g., a representation of physical object 160) in the image and determines an object POI in the detected object of the image. Locator module 120 maps the object POI to a centerline of a railroad track (e.g., a representation of railroad track 180) in the image to generate a POI. The POI represents the location of physical object 160 as transposed to the centerline of track 180. Locator module 120 determines a number of pixels from the POI of the image to an edge of the image. Locator module 120 determines first distance 190 from the POI to camera 140 using the number of pixels and camera view angle 142 and determines second distance 192 from camera 140 to GPS unit 150. Locator module 120 adds first distance 190 to second distance 192 to determine offset distance 194. Locator module 120 modifies the GPS location based on the offset distance to determine a geographical POI location associated with physical object 160. As such, system 100 of FIG. 1 locates objects without manual measurements on or near the railroad, which improves the safety and efficiency of locating objects.

Although FIG. 1 illustrates a particular number of networks 110, locator modules 120, vehicles 130, cameras 140, GPS units 150, and physical objects 160, this disclosure contemplates any suitable number of networks 110, locator modules 120, vehicles 130, cameras 140, GPS units 150, and physical objects 160. For example, system 100 of FIG. 1 may include more than one camera 140 and/or GPS unit 150. Although FIG. 1 illustrates a particular arrangement of network 110, locator module 120, vehicle 130, camera 140, GPS unit 150, and physical object 160, this disclosure contemplates any suitable arrangement of network 110, locator module 120, vehicle 130, camera 140, GPS unit 150, and physical objects 160. For example, GPS unit 150 may be mounted to a rear portion of vehicle 130. As another example, camera 140 and/or GPS unit 150 may be an integral part of vehicle 130. One or more components of system 100 may be implemented using one or more components of the computer system of FIG. 6. System 100 of FIG. 1 may utilize one or more programs to perform one or more operations. For example, locator module 120 may use a geographic information system (GIS), visualization software, an internet service program, and the like.

Although FIG. 1 describes system 100 for locating objects within a railroad environment, one or more components of system 100 may be applied to other implementations. For example, one or more components of system 100 may be utilized for locating objects along a highway, a canal, a trail, a pipeline, and the like.

FIG. 2 illustrates an example system 200 for locating objects that may be used by system 100 of FIG. 1. System 200 or portions thereof may be associated with an entity, which may include any entity, such as a business, company (e.g., a railway company, a transportation company, etc.), or a government agency (e.g., a department of transportation, a department of public safety, etc.) that may locate objects. The elements of system 200 may be implemented using any suitable combination of hardware, firmware, and software. System 200 of FIG. 2 includes network 110, locator module 120, camera 140, and GPS unit 150. Locator module 120 of system 200 includes an interface 222, a memory 224, and a processor 226.

Interface 222 of locator module 120 represents any suitable computer element that can receive information from network 110, transmit information through network 110, perform suitable processing of the information, communicate to other components (e.g., camera 140 and GPS unit 150) of system 200 of FIG. 2, or any combination of the preceding. Interface 222 represents any port or connection, real or virtual, including any suitable combination of hardware, firmware, and software, including protocol conversion and data processing capabilities, to communicate through a LAN, a WAN, or other communication system that allows system 200 of FIG. 2 to exchange information between components of system 100.

Memory 224 of locator module 120 stores, permanently and/or temporarily, received and transmitted information, as well as system software, control software, other software for locator module 120, and a variety of other information. Memory 224 may store information for execution by processor 226. Memory 224 includes any one or a combination of volatile or non-volatile local or remote devices suitable for storing information. Memory 224 may include Random Access Memory (RAM), Read-only Memory (ROM), magnetic storage devices, optical storage devices, or any other suitable information storage device or a combination of these devices. Memory 224 may include any suitable information for use in the operation of locator module 120. Additionally, memory 224 may be a component external to (or may be partially external to) locator module 120. Memory 224 may be located at any location suitable for memory 224 to communicate with locator module 120. In the illustrated embodiment of FIG. 2, memory 224 of locator module 120 stores a data collection engine 230, a pixel engine 232, a locator engine 234, a comparison engine 236, and a database 250. In certain embodiments, data collection engine 230, pixel engine 232, locator engine 234, comparison engine 236, and/or database 250 may be external to memory 224 and/or locator module 120.

Data collection engine 230 of locator module 120 is an application that collects data from one or more components of system 100. Data collection engine 230 may collect data from GPS unit 150, camera 140, an administrator, and the like. Data collection engine 230 may receive one or more images 252 from camera 140 of system 200 via network 110. Images 252 represent the views of the environment captured by camera 140. Each image 252 may include a representation of a physical object and a railroad track (e.g., physical object 160 and railroad track 180 of FIG. 1). Data collection engine 230 may receive one or more GPS locations 258 from GPS unit 150. Each GPS location 258 may be represented by coordinates (e.g., a latitude coordinate and a longitude coordinate) or any other suitable representation. Data collection engine 230 may collect data associated with a travel direction of vehicle 130 of FIG. 1. For example, data collection engine 230 may receive a travel direction (e.g., north or south) of vehicle 130 from an administrator, a motion sensor associated with vehicle 130, and the like.

In certain embodiments, data collection engine 230 detects an object (e.g., object 310 of FIG. 3) in image 252 representative of physical object 160 of FIG. 1. Data collection engine 230 determines an object POI 254 in the detected object of image 252. Object POI 254 represents a specific reference point within the detected object of image 252. Data collection engine 230 maps object POI 254 to a centerline of a railroad track (e.g., a representation of railroad track 180 of FIG. 1) in image 252 to generate POI 256. POI 256 represents a location of physical object 260 transposed to the centerline of the railroad track. The process of generating POI 256 of image 252 is described in more detail in FIG. 3 below for image 300. In certain embodiments, rather than determining POI 256, data collection engine 230 may receive image 252 from data collection engine 230 with POI 256 included.

Pixel engine 232 of locator module 120 is an application that analyzes pixels of image 252. Pixel engine 232 may receive image 252 with POI 256 from data collection engine 230 and determine a number of pixels from POI 256 of image 252 to an edge of image 252. The edge of image 252 represents a location of camera 140. Pixel engine 232 may convert each pixel from POI 256 to the edge of image 252 to an equivalent distance. Each pixel may be associated with a different distance due to the camera view angle. The process of converting the pixels to a distance is described in more detail in FIG. 3 below for image 300.

Locator engine 234 of locator module 120 is an application that determines POI location 260 associated with physical object 160. Locator engine 234 may determine first distance 190 from POI 256 to camera 140 using the number of pixels and an angle of camera 140 (e.g., camera view angle 142 of FIG. 1). Locator engine 234 may determine second distance 192 from camera 140 to GPS unit 150. Second distance 192 may be a predetermined distance based on the relative locations of camera 140 and GPS unit 150. Locator engine 234 may add first distance 190 to second distance 192 to determine offset distance 194.

In certain embodiments, locator engine 234 receives GPS location 258 from data collection engine 230 and determines POI location 260 associated with physical object 160 of FIG. 1 using GPS location 258, offset distance 194, and the travel direction of vehicle 130 of FIG. 1. For example, locator engine 234 may receive GPS location 258 from data collection engine 230 represented by latitude and longitude coordinates (e.g., N38 03.9325, W97 18.7658) or any other suitable representation. Locator engine 234 may receive an indication from data collection engine 230 that vehicle 130 of FIG. 1 is traveling in a descending direction. Locator engine 234 may adjust GPS location 258 to account for offset distance 194 (e.g., 39.2 feet) and the travel direction, which yields POI location 260 (e.g., Lat=38.06555556, long=−97.3127778). POI location 260 represents the geographical location of physical object 160 of FIG. 1 transposed to the centerline of railroad track 180 of FIG. 1. In certain embodiments, physical object 160 is a PTC critical asset.

In certain embodiments, a program external to system 200 (e.g., a web service and/or cloud service program) may perform one or more determinations for locator engine 234. For example, a user (e.g., an administrator of system 200) may input GPS location 258, offset distance 194, and the travel direction into an external program, and the web service program may generate POI location 260.

Comparison engine 236 of locator module 120 is an application that compares two determined locations associated with physical object 160 of FIG. 1. Comparison engine 236 may compare POI location 260 to a field location 262 associated with physical object 160. Field location 262 is a location that is determined by field measurement. Comparison engine 236 may determine whether POI location 260 and field location 262 are within a predetermined distance of each other. The predetermined distance may be a distance that is less than or equal to twenty feet (e.g., one foot, three feet, or ten feet). The predetermined distance may be determined based on one or more requirements (e.g., an auditing requirement). In the event that comparison engine 236 determines that POI location 260 and field location 262 are within a predetermined distance of each other, comparison engine 236 may generate an indication that the location of physical object 160 complies with one or more requirements (e.g., a PTC compliance requirement). In the event that comparison engine 236 determines that POI location 260 and field location 262 are separated by more than the predetermined distance, comparison engine 236 may generate an indication that the location of physical object 160 does not comply with one or more requirements. For example, comparison engine 236 may apply a defect to physical object 160.

In certain embodiments, comparison engine 236 may generate a report that indicates which physical objects 160 are defective and/or which physical objects 160 are in compliance. In certain embodiments, comparison engine 236 may generate instructions in response to determining that one or more physical objects 160 are defective or in compliance. The instructions may include actions to be taken such as performing one or more field measurements for all defective physical objects 160.

Database 250 of locator module 120 may store certain types of information for locator module 120. For example, database 250 may store one or more images 252, object POIs 254, POIs 256, GPS locations 258, POI locations 260, first distances 190, second distances 192, offset distances 194, and field locations 262. Database 250 may be any one or a combination of volatile or non-volatile local or remote devices suitable for storing information. Database 250 may include RAM, ROM, magnetic storage devices, optical storage devices, or any other suitable information storage device or a combination of these devices. Database 250 may be a component external to locator module 120. Database 250 may be located in any location suitable for database 250 to store information for locator module 120. For example, database 250 may be located in a cloud environment.

Processor 226 of locator module 120 controls certain operations of locator module 120 by processing information received from interface 222 and memory 224 or otherwise accessed by processor 226. Processor 226 communicatively couples to interface 222 and memory 224. Processor 226 may include any hardware and/or software that operates to control and process information. Processor 226 may be a programmable logic device, a microcontroller, a microprocessor, any suitable processing device, or any suitable combination of the preceding. Additionally, processor 226 may be a component external to locator module 120. Processor 226 may be located in any location suitable for processor 226 to communicate with locator module 120. Processor 226 of locator module 120 controls the operations of data collection engine 230, pixel engine 232, locator engine 234, and comparison engine 236.

Camera 140 of system 200 captures images 252 of one or more physical objects. For example, camera 140 of system 200 may be attached to a front end of a geometry car traveling along a railroad track and may capture image 252 of a physical object within the railroad environment associated with the railroad track. GPS unit 150 of system 200 captures one or more GPS locations 258. For example, GPS unit 150 may be attached to a center portion of the geometry car traveling along the railroad track and capture GPS location 258 of GPS unit 150 at the time camera 140 captures image 252. Camera 140 and GPS unit 150 communicate images 252 and GPS locations 258 to locator module 120 via network 110, and locator module 120 uses data collection engine 230, pixel engine 232, and/or locator engine 234 to determine POI locations 260 associated with the physical objects. Locator module 120 may then use comparison engine 236 to compare POI locations to field locations 262. As such, system 200 may be used to verify the locations of physical objects (e.g., PTC critical assets) within a railroad environment.

Although FIG. 2 illustrates a particular arrangement of network 110, locator module 120, interface 222, memory 224, processor 226, data collection engine 230, pixel engine 232, locator engine 234, comparison engine 236, database 250, camera 140, and GPS unit 150, this disclosure contemplates any suitable arrangement of network 110, locator module 120, interface 222, memory 224, processor 226, data collection engine 230, pixel engine 232, locator engine 234, comparison engine 236, database 250, camera 140, and GPS unit 150. Network 110, locator module 120, interface 222, memory 224, processor 226, data collection engine 230, pixel engine 232, locator engine 234, comparison engine 236, database 250, camera 140, and GPS unit 150 may be physically or logically co-located with each other in whole or in part.

FIG. 3 shows an example image 300 that may be used by the systems of FIGS. 1 and 2. Image 300 may represent one or more images 252 of FIG. 2. Image 300 may be generated by camera 140 of FIG. 1 and/or FIG. 2. Image 300 includes object 310. Object 310 is a representation of physical object 160 of FIG. 1 as captured by camera 140. In the illustrated embodiment of FIG. 3, object 310 is a graphical representation of a mile post sign. Image 300 includes railroad track 320. Railroad track 320 is a representation of railroad track 180 of FIG. 1. Railroad track 320 of image 300 includes two rails. Centerline 330 of railroad track 320 is a reference line that is centered between the two outer rails of railroad track 320.

Image 300 of FIG. 3 includes object POI 340. Object POI 340 may represent object POI 254 of system 200 of FIG. 2. Object POI 340 is a specific reference point within object 310 of image 300. In the illustrated embodiment of FIG. 3, object POI 340 is located at the base of object 310. Image 300 includes POI 350. POI 350 may represent POI 256 of FIG. 2. POI 350 represents a location of object POI 340 transposed a distance 360 to centerline 330 of railroad track 320. Distance 360 may be measured perpendicularly from centerline 330 of railroad track 320 to object POI 340. Distance 360 may be measured horizontally from POI 350 to object POI 340 in relation to an edge (e.g., image edge 370) of image 300.

Image 300 has a horizontal measurement and a vertical measurement expressed in pixels. Each pixel of image 300 is a unit of programmable color in image 300. The pixel dimensions of image 300 are expressed as a number of pixels horizontally and a number of pixels vertically that define the resolution of image 300. Each pixel may be converted to a linear distance. The pixel conversion may depend on the camera view angle (e.g., camera view angle 142 of FIG. 1) such that each pixel corresponds to a different distance.

Image edge 370 of FIG. 3 represents an outer boundary of image 300. Image edge 370 may correspond to a location of camera 140 of FIG. 1 such that distance 380 from POI 350 to image edge 370 represents the distance from POI 350 to camera 140 (e.g., a lens of camera 140) of FIG. 1. Distance 380 may be measured perpendicularly from image edge 370 to POI 350. Distance 360 may be measured from image edge 370 to POI 350 along centerline 330 of railroad track 320. Distance 380 may be represented as a number of pixels n, where n represents any suitable integer (e.g., 200 pixels). The number of pixels may be converted to a linear measurement (e.g., 254.63 inches or 21.2 feet). The linear measurement may be represented by any suitable measurement (e.g., inches, feet, meters, centimeters, etc.) As such, image 300 of FIG. 3 may be used to determine distance 380 (e.g., first distance 190 of FIG. 1) from POI 350 to camera 140 of FIG. 1 without field measurement, which may improve the efficiency and accuracy of locating objects within an environment.

Modifications, additions, or omissions may be made to image 300 depicted in FIG. 3. For example, image 300 may include more or less than two railroad tracks. As another example, image 300 may include more than one object 310. Although image 300 of FIG. 3 illustrates a particular arrangement of object 310 and track 320, this disclosure contemplates any suitable arrangement of object 310 and track 320. For example, object 310 may be located on the opposite side of track 320.

FIG. 4 illustrates an example output 400 that may be generated by system 100 of FIG. 1 and/or system 200 of FIG. 2. In the illustrated embodiment of FIG. 4, output 400 is represented by a screenshot. Output 400 includes railroad track 410, railroad track 420, GPS input 430, offset input 440, location output 450, and location output 460. Railroad track 410 and railroad track 420 represent centerlines of adjacent railroad tracks in a railroad environment.

GPS input 430 of FIG. 4 represents an input of a GPS location (e.g., GPS location 258 of FIG. 2). The GPS location may be generated by a GPS unit (e.g., GPS unit 150 of FIG. 1) mounted to the top of a vehicle (e.g., vehicle 130 of FIG. 1). The GPS location may be captured at a time when a camera (e.g., camera 140 of FIG. 1) captures an image of a physical object (e.g., physical object 160 of FIG. 1) in a railroad environment. GPS input 430 is represented as a latitude coordinate and a longitude coordinate. In certain embodiments, an administrator (e.g., a railway engineer) may enter GPS input 430 into a program (e.g., a web service program). As illustrated in output 400 of FIG. 4, GPS input 430 is located relative to railroad track 410. In certain embodiments, railroad track 410 is selected in lieu of railroad track 420 due to the GPS location of GPS input 430 being closer in distance to railroad track 410 than railroad track 420.

Offset input 440 of FIG. 4 represents an input of an offset distance (e.g., offset distance 194 of FIG. 1) as measured between the physical object captured by the camera mounted to the vehicle and the GPS unit mounted to the vehicle. Offset input 440 is used to modify GPS input 430 to account for the offset distance. As illustrated in output 400 of FIG. 4, a circle is generated around the intersection of GPS input 430 and railroad track 410. The radius of the circle is equal to the offset distance. Location output 450 represents the distance from GPS input 430 as offset by offset distance 194 in a first direction (e.g., east) along railroad track 410. Location output 460 represents the distance from GPS input 430 as offset by offset distance 194 in a second direction along railroad track 410. Location output 450 is selected as the POI location (e.g., POI location 260 of FIG. 2) associated with the physical object if the train is traveling in the first direction (e.g., east). Location output 460 is selected as the POI location associated with the physical object if the train is traveling in the second direction (e.g., west).

Modifications, additions, or omissions may be made to output 400 depicted in FIG. 4. For example, output 400 may include more or less than two railroad tracks. As another example, output 400 may include more or less than two location outputs. As still another example, output 400 may include values (e.g., numeric or alphanumeric values) representative of GPS input 430, offset input 440, location output 450, and/or location output 450.

FIG. 5 illustrates an example method 500 for locating objects. Method 500 begins at step 505. At step 510, a locator module (e.g., locator module 120 of FIG. 2) receives a GPS location generated by a GPS unit (e.g., GPS unit 150 of FIG. 1) associated with a vehicle (e.g., vehicle 130 of FIG. 1). The GPS unit may be attached to a center portion of the roof of the vehicle. The vehicle may be a geometry car that travels along a railroad track of a railroad environment. The GPS location may be represented by latitude and longitude coordinates (e.g., N38 03.9325, W97 18.7658) or any other suitable representation. Method 500 then moves from step 510 to step 515.

At step 515, the locator module receives an image (e.g., image 300 of FIG. 3) generated by a camera (e.g., camera 140 of FIG. 1) associated with the vehicle. The camera may be attached to a front end of the roof of the vehicle. The image may be an image of the railroad environment as captured from the front end of the vehicle. Method 500 then moves from step 515 to step 520. At step 520, the locator module detects an object in the image. The object may represent a physical object (e.g., physical object 160 of FIG. 1) within the railroad environment, such as a train-controlled signal, a switch point, a crossing, a mile post sign, a speed sign, a clearance point, etc. In certain embodiments, the object represents a PTC critical asset. Method 500 then moves from step 520 to step 525.

At step 525, the locator module determines an object POI in the detected object of the image. The object POI is a specific point within the object. For example, the object POI may be a specific point at the bottom of a mile post sign. Method 500 then moves from step 525 to step 530, where the locator module maps the object POI to a centerline of a railroad track in the image to generate a POI. The POI represents a location of the physical object transposed to the centerline of the railroad track. Method 500 then moves from step 530 to step 535.

At step 535, the locator module determines a number of pixels from the POI of the image to an edge of the image. The edge of the image represents a location of the camera. The locator module may convert the number of pixels to a linear distance. Method 500 then moves from step 535 to step 540, where the locator module determines a first distance (e.g., first distance 190 of FIG. 1) from the POI to the camera using the number of pixels and an angle of the camera (e.g., camera view angle 142 of FIG. 1). The first distance may be represented as a linear horizontal distance (e.g., 21.2 feet) as measured along the centerline of the railroad track. The linear horizontal distance may be represented by any suitable measurement (e.g., inches, feet, meters, centimeters, etc.). Method 500 then moves from step 540 to step 545.

At step 545, the locator module determines a second distance (e.g., second distance 192 of FIG. 1) from the camera to the GPS unit. The second distance may be a predetermined distance between the location of the camera mounted on the vehicle and the location of the GPS unit mounted on the vehicle. The second distance may be represented as a linear horizontal distance (e.g., 18 feet) as measured along the centerline of the railroad track. The linear horizontal distance may be represented by any suitable measurement (e.g., inches, feet, meters, centimeters, etc.) Method 500 then moves from step 545 to step 550, where the locator module adds the first distance to the second distance to determine an offset distance (e.g., offset distance 194 of FIG. 1) from the POI to the GPS unit. The offset distance may be represented as a linear horizontal distance (e.g., 39.2 feet) as measured along the centerline of the railroad track. The linear horizontal distance may be represented by any suitable measurement (e.g., inches, feet, meters, centimeters, etc.) Method 500 then moves from step 550 to step 555.

At step 555, the locator module determines a travel direction (e.g., east or west) of the vehicle along the railroad track at the time the GPS location and the image were captured. Method 500 then moves from step 555 to step 560, where the locator module determines a POI location associated with the physical object using the GPS location, the offset distance, and the travel direction of the vehicle. For example, the locator module may modify the GPS location (e.g., N38 03.9325, W97 18.7658) by the offset distance (e.g., 39.2 feet) and the vehicle travel direction (e.g., east) to generate a geographical POI location (e.g., Lat=38.06555556, long=−97.3127778). The geographical POI location may be represented by any suitable representation. Method 500 then moves from step 560 to step 565.

At step 565, locator module compares the POI location to a field location (e.g., field location 262 of FIG. 2). The field location represents a location of the physical object as measured in the field. Method 500 then moves from step 565 to step 570, where the locator module determines whether the POI location and the field location are separated by more than a predetermined distance (e.g., three feet). If the locator module determines that the POI location and the field location are separated by more than the predetermined distance, method 500 moves from step 570 to step 575, where the locator module applies a defect to the physical object. If the locator module determines that the POI location and the field location are not separated by more than the predetermined distance, method 500 moves from step 570 to step 580, where the locator module verifies the location of physical object. Method 500 then moves from steps 575 and 580 to step 585, where method 500 ends.

Modifications, additions, or omissions may be made to method 500 depicted in FIG. 5. Method 500 may include more, fewer, or other steps. For example, method 500 may include generating a report in response to applying a defect to the physical object at step 575 and/or in response to verifying the location of the physical object at step 580. Steps may be performed in parallel or in any suitable order. While discussed as specific components completing the steps of method 500, any suitable component may perform any step of method 500. For example, a web service may determine the geographical location of the POI at step 560.

FIG. 6 shows an example computer system that may be used by the systems and methods described herein. For example, network 110, locator module 120, camera 140, and/or GPS unit 150 of FIG. 1 may include one or more interface(s) 610, processing circuitry 620, memory(ies) 630, and/or other suitable element(s). Interface 610 (e.g., interface 222 of FIG. 2) receives input, sends output, processes the input and/or output, and/or performs other suitable operation. Interface 610 may include hardware and/or software.

Processing circuitry 620 (e.g., processor 226 of FIG. 2) performs or manages the operations of the component. Processing circuitry 620 may include hardware and/or software. Examples of a processing circuitry include one or more computers, one or more microprocessors, one or more applications, etc. In certain embodiments, processing circuitry 620 executes logic (e.g., instructions) to perform actions (e.g., operations), such as generating output from input. The logic executed by processing circuitry 620 may be encoded in one or more tangible, non-transitory computer readable media (such as memory 630). For example, the logic may include a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 630 (or memory unit) stores information. Memory 630 (e.g., memory 224 of FIG. 2) may include one or more non-transitory, tangible, computer-readable, and/or computer-executable storage media. Examples of memory 630 include computer memory (for example, RANI or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system for locating objects, comprising:
a data collection engine configured to collect data, via one or more processors, from a GPS unit, a camera, and an administrator, and detect an object in an image representative of a physical object, wherein the data collection engine receives the image from the camera via a network;
a pixel engine configured to analyze, via the one or more processors, pixels of the image with a point of interest (POI) from data collection engine and determine a number of pixels from the POI of the image to an edge of image;
a locator engine configured to determine, via the one or more processors, a POI location associated with physical object by determining a first distance from the POI to the camera using the number of pixels and an angle of camera; and
a comparison engine configured to compare, via the one or more processors, two determined locations associated with the physical object by comparing the POI location to a field location associated with physical object.

2. The system of claim 1, wherein each image includes a representation of a physical object and a railroad track.

3. The system of claim 1, wherein the data collection engine determines an object POI in the detected object of image, wherein the object POI represents a specific reference point within the detected object of image.

4. The system of claim 3, wherein the data collection engine maps the object POI to a centerline of a railroad track in the image to generate the POI representing a location of the physical object transposed to the centerline of the railroad track.

5. The system of claim 1, wherein the edge of the image represents a location of the camera.

6. The system of claim 1, wherein the pixel engine converts each pixel from the POI to the edge of the image to an equivalent distance.

7. The system of claim 6, wherein each pixel may be associated with a different distance due to the camera view angle.

8. The system of claim 1, wherein the locator engine receives a GPS location from the data collection engine and determines the POI location associated with the physical object using the GPS location, an offset distance, and a travel direction.

9. The system of claim 1, wherein the field location is a location determined by field measurement.

10. The system of claim 1, wherein the comparison engine determines whether the POI location and the field location are within a predetermined distance of each other.

11. A method for locating objects, comprising:
collecting data, via a data collection engine, from a GPS unit, a camera, and an administrator, and detect an object in an image representative of a physical object, wherein the data collection engine receives the image from the camera via a network;
analyzing, via a pixel engine, pixels of the image with a point of interest (POI) from data collection engine and determine a number of pixels from the POI of the image to an edge of image;

determining, via a locator engine, a POI location associated with physical object by determining a first distance from the POI to the camera using the number of pixels and an angle of camera; and comparing, via a comparison engine, two determined locations associated with the physical object by comparing the POI location to a field location associated with physical object.

12. The method of claim 11, wherein each image includes a representation of a physical object and a railroad track.

13. The method of claim 11, wherein the data collection engine determines an object POI in the detected object of image, wherein the object POI represents a specific reference point within the detected object of image.

14. The method of claim 13, wherein the data collection engine maps the object POI to a centerline of a railroad track in the image to generate the POI representing a location of the physical object transposed to the centerline of the railroad track.

15. The method of claim 11, wherein the edge of the image represents a location of the camera.

16. The method of claim 11, wherein the pixel engine converts each pixel from the POI to the edge of the image to an equivalent distance.

17. The method of claim 16, wherein each pixel may be associated with a different distance due to the camera view angle.

18. The method of claim 11, wherein the locator engine receives a GPS location from the data collection engine and determines the POI location associated with the physical object using the GPS location, an offset distance, and a travel direction.

19. The method of claim 11, wherein the field location is a location determined by field measurement.

20. The method of claim 11, wherein the comparison engine determines whether the POI location and the field location are within a predetermined distance of each other.

* * * * *